United States Patent [19]

Takano et al.

[11] Patent Number: 5,064,730

[45] Date of Patent: * Nov. 12, 1991

[54] MAGNETIC RECORDING MEDIUM

[75] Inventors: Fumio Takano, Kawasaki; Eitaro Nakamura, Tokyo, both of Japan

[73] Assignee: Nippon Zeon Co., Ltd., Tokyo, Japan

[*] Notice: The portion of the term of this patent subsequent to Feb. 13, 2007 has been disclaimed.

[21] Appl. No.: 480,444

[22] Filed: Feb. 15, 1990

[30] Foreign Application Priority Data

Feb. 16, 1989 [JP] Japan .................................. 1-36704

[51] Int. Cl.$^5$ ............................................. G11B 23/00
[52] U.S. Cl. .................................... 428/694; 428/696; 428/900
[58] Field of Search ................ 428/900, 694, 696

[56] References Cited

U.S. PATENT DOCUMENTS

| | | | |
|---|---|---|---|
| 4,600,521 | 7/1986 | Nakamura et al. | 252/62.54 |
| 4,743,501 | 5/1988 | Eguchi et al. | 428/328 |
| 4,770,941 | 9/1988 | Imai et al. | 428/411.1 |
| 4,784,913 | 11/1988 | Nakamura et al. | 428/411.1 |
| 4,842,942 | 6/1989 | Yatsuka et al. | 428/425.9 |
| 4,861,683 | 8/1989 | Nakachi et al. | 428/694 |
| 4,900,631 | 2/1990 | Yamakawa et al. | 428/483 |

FOREIGN PATENT DOCUMENTS 62-8329 1/1987 Japan .

*Primary Examiner*—Cashion, Jr. Merrell C.
*Assistant Examiner*—Stevan A. Resan
*Attorney, Agent, or Firm*—Armstrong, Nikaido, Marmelstein, Kubovcik & Murray

[57] ABSTRACT

Disclosed is a magnetic recording medium having a magnetic layer comprising a vinyl chloride copolymer as a binder and a magnetic powder and formed on a non-magnetic support. The vinyl chloride copolymer contains a hydroxyl group and a quaternary ammonium salt, wherein the hydroxyl group is derived from a monoallyl or monomethallyl ether of a polyhydroxyl compound, or a monoallyl or monomethallyl thioether of a polyhydroxyl compound. The vinyl chloride copolymer may further contain a hydrophilic group derived from at least one monomer which is selected from carboxylic acids, sulfur-containing acids, phosphorus-containing acids and salts thereof.

11 Claims, No Drawings

MAGNETIC RECORDING MEDIUM

BACKGROUND OF THE INVENTION

1. Field of the Invention

This invention relates to a magnetic recording medium such as a magnetic tape, a magnetic card or a magnetic disk. More particularly, it relates to an improvement of a binder contained in a magnetic layer formed on a non-magnetic support.

2. Description of the Related Art

In general, a magnetic recording medium such as a magnetic tape or a floppy disk is prepared by coating a magnetic paint formed by dispersing a ferromagnetic powder together with an organic polymer as a binder in an organic solvent on a polymeric film or sheet.

As the organic polymer in the magnetic paint, a relatively hard resin such as polyvinyl chloride, polyvinyl butyral, nitrocellulose or acetylcellulose and a soft resin such as a polyester, a polyurethane or an acrylonitrile/butadiene copolymer are often used in combination. Moreover, to improve the durability of the coating, a polyisocyanate compound is often incorporated as a heat-curing component. Accordingly, the organic polymer used as the binder must have an appropriate compatibility with other polymer and an appropriate reactivity with the polyisocyanate, a good affinity with the magnetic powder and a function of dispersing the magnetic powder homogeneously in the paint.

Due to a recent increase in the demand for a higher recording density and a higher S/N ratio in the magnetic recording material, the particle size of the magnetic powder is made finer and the coercive force of the magnetic powder is increased, and therefore, the dispersing capacity of the binder is an important factor for dispersing the magnetic powder uniformly in the paint, forming a smooth magnetic layer having a high degree of filling, and improving the performances of the binder.

To improve the dispersion state of the magnetic powder, usually a method is adopted in which a surface active agent having a low molecular weight is used as the dispersant, but in view of the durability of the magnetic recording medium and a prevention of contamination of the head, the amount of the dispersant used is naturally limited, and to improve the reliability of the magnetic recording medium, the binder must have a dispersing capacity. Separately, a method in which a curable compound represented by a polyisocyanate compound is incorporated in a paint whereby the formed magnetic layer is crosslinked is customarily adopted for increasing the durability and reliability of the recording medium, especially in the field of a recording magnetic tape, and in this case, the binder must have an appropriate reactivity with the polyisocyanate. If this reactivity is too high, however, the pot life of the paint is short and the paint is disadvantageous from the economical viewpoint. If the reactivity is too low, the desired improved durability or traveling property cannot be obtained.

With a view to improving the binder, so as to cope with this increase of the performance of the magnetic recording medium, especially in connection with polyvinyl chloride (PVC) binders, the inventors investigated known PVC binders, and found the following. In a vinyl chloride/vinyl alcohol/vinyl acetate copolymer, the dispersing capacity for the magnetic powder increases with an increase of the ratio of the vinyl alcohol, but the degree of the improvement is low and the aid of a dispersant is necessary. Furthermore, as the proportion of the vinyl alcohol increases, the pot life becomes short and the moisture resistance of the coating is degraded, and furthermore, the rate of the thermal decomposition increases. A vinyl chloride/maleic acid/vinyl acetate copolymer is fully adsorbed in the magnetic powder and exerts an excellent dispersing capacity, but an increase of the viscosity or gelation readily occurs and the reaction with the polyisocyanate tends to occur locally.

As the means for solving the problems of typical PVC binders, there have been proposed a method in which parts of OH groups of a vinyl chloride/vinyl alcohol/vinyl acetate copolymer are substituted with an organic group having a hydrophilic group such as $COOM$, $SO_3M$, $SO_4M$ or $PO(OM)_2$ (in which M represents hydrogen, an alkali metal or ammonium) (Japanese Unexamined Patent Publication No. 57-44227), a method in which a vinyl chloride/vinyl acetate copolymer having a hydrophilic group as mentioned above is saponified (Japanese Unexamined Patent Publication No. 58-114330, No. 61-57640 and No. 61-96515), and a method in which a vinyl chloride/vinyl alcohol/vinyl acetate copolymer having an ion-dissociative hydrophilic group introduced therein is used. According to these proposals, the dispersibility is improved but the level of improvement level is still too low, and since these methods include the saponification step the heat stability of the polymers is poor, and in magnetic recording media formed by using these polymers, there is a risk of a reduction of the reliability with time.

Furthermore, a method has been proposed in which a copolymer of a hydroxyl group-containing monomer such as hydroxylethyl (meth)acrylate or hydroxylpropyl (meth)acrylate with an ion-dissociative hydrophilic group-containing monomer is used so that deterioration of the polymer by the saponification is avoided (Japanese Unexamined Patent Publication No. 56-77930, No. 60-185226, No. 60-235814, No. 62-73416, No. 62-73417 and No. 62-134819). In this case, the dispersibility and heat stability are improved, compared with the case where the polymer comprising vinyl alcohol units are used as the hydroxyl group-containing groups, but the improvement is still unsatisfactory, and at the time of application, the pot life after the addition of the polyisocyanate compound is often too short.

A lubricant represented by a fatty acid is added to a magnetic paint to maintain a good traveling performance, but if the heretofore proposed vinyl chloride binders contain a hydroxyl group in an amount enough to impart a sufficient degree of crosslinking by the reaction with the polyisocyanate, as pointed out above, the problem arises of a reduction of the dispersion stability of the magnetic paint, and this tendency becomes conspicuous as the particle size of the magnetic powder is decreased.

SUMMARY OF THE INVENTION

An object of the present invention is to solve the above-mentioned problems involved in the preparation of the conventional magnetic recording medium comprising a polyvinyl chloride type binder containing hydroxyl group, namely, to provide a specific vinyl chloride copolymer binder exhibiting a good magnetic powder-dispersing property and a good stability of the dispersion with the lapse of time, a good reactivity with a polyisocyanate even at a low hydroxyl group content and a good chemical heat stability, and thus to provide a magnetic recording medium having magnetic characteristics, electro-magnetic conversion characteristics and durability.

In accordance with the present invention, there is provided a magnetic recording medium having a magnetic layer comprising a vinyl chloride copolymer as a binder and a magnetic powder and formed on a non-magnetic support, characterized in that the vinyl chloride copolymer contains a hydroxyl group and a quaternary ammonium salt, wherein said hydroxyl group is derived from a monoallyl or monomethallyl ether of a polyhydroxyl compound, or a monoallyl or monomethallyl thioether of a polyhydroxyl compound.

The vinyl chloride copolymer used as a binder may contain, in addition to a hydroxyl group and a quaternary ammonium salt, at least one anionic hydrophilic group derived from at least one monomer selected from carboxylic acids, sulfur-containing acids, phosphorus-containing acids, and salts thereof.

DESCRIPTION OF THE PREFERRED EMBODIMENTS

The monoallyl or monomethallyl ether of the polyhydroxyl compound or the monoallyl or monomethallyl thioether of the polyhydroxyl compound is used in such an amount that the content of hydroxyl groups in the vinyl chloride copolymer is 0.05 to 3.0% by weight, preferably 0.1 to 2.0% by weight, based on the weight of the copolymer. If the content of hydroxyl groups is lower than 0.05% by weight, the crosslinking effect with the polyisocyanate is not exerted, and if the hydroxyl group content exceeds 3.0% by weight, the pot life is too short.

As examples of the mono(meth)allyl ether of the polyhydroxyl compound used to impart hydroxyl groups to the vinyl chloride copolymer in the present invention, there can be mentioned mono(meth)allyl ethers of alkylene glycols such as (meth)allyl-2-hydroxyethyl ether, (meth)allyl-2-hydroxypropyl ether, (meth)allyl -3-hydroxypropyl ether, (meth)allyl-2-hydroxybutyl ether, (meth)allyl-3-hydroxybutyl ether, (meth)allyl-4-hydroxybutyl ether and (meth)allyl-6-hydroxyhexyl ether, mono(meth)allyl ethers of polyoxyalkylene glycols such as diethylene glycol mono(meth)allyl ether and dipropylene glycol mono(meth)allyl ether, mono(meth)allyl ethers of halogen-substituted and hydroxyl-substituted (poly)alkylene glycols such as glycerol mono(meth)allyl ether, (meth)allyl-2-chloro -3-hydroxypropyl ether and (meth)allyl-2-hydroxy -3-chloropropyl ether, and mono(meth)allyl ethers of polyhydric phenols such as eugenol and isoeugenol and halogen substitution products thereof. Instead of the above-mentioned ethers of polyhydroxyl compounds with (meth)allyl alcohol, thioethers formed by using (meth)allylthiol instead of (meth)allyl alcohol can be used as the hydroxyl group-supplying monomer in the present invention. For example, there can be mentioned (meth)allyl-2-hydroxyethyl thioether and (meth)allyl -2-hydroxypropyl thioether.

As the method of giving a quaternary ammonium salt to the vinyl chloride copolymer used in the present invention, there can be mentioned a method in which a quaternary ammonium salt-containing monomer is co-polymerized.

As the quaternary ammonium salt-containing monomer, there can be mentioned diallyldimethylammonium chloride, diallyldimethylammonium stearate, 2-hydroxy-3-allyloxy-propyltrimethylammonium chloride, vinylbenzyltrimethylammonium chloride, (meth)acryloyloxyethyltrimethylammonium chloride, 2-hydroxy-3-methacryloyloxypropyltrimethylammonium chloride, (meth)acryloyloxypropyldimethylbenzylammonium chloride and (meth)acrylamidopropyltrimethylammonium chloride (first method).

Another method for giving a quaternary ammonium salt to the vinyl chloride copolymer used in the present invention comprises treating a vinyl chloride copolymer containing the above-mentioned polyhydroxyl compound mono(meth)allyl ether or thioether as a copolymerization component and further containing an epoxy group, with a tertiary amine in the presence or absence of an acid.

As the tertiary amine used in this method, there can be mentioned saturated tertiary amines such as pyridine, dimethyllaurylamine, triethylamine and diethylethanolamine, and unsaturated tertiary amines such as diethylaminoethyl (meth)acrylate and dimethylaminopropyl (meth)acrylate. The introduction of the epoxy group to be reacted with the tertiary amine into the vinyl chloride copolymer can be accomplished by copolymerization with a monomer containing an epoxy group or by epoxidization of double bonds, formed by dehydrochlorination of a vinyl chloride copolymer with an alkali or by application of heat, with a peracid or the like. As the epoxy group-containing monomer, there can be mentioned allylglycidyl ether, vinylcyclohexene monooxide and glycidyl (meth)acrylate. Especially when vinyl chloride copolymerized with allylglycidyl ether is used, by making water or an appropriate acid present at the reaction with the tertiary amine, the hydration reaction of the epoxy group occurs simultaneously with the formation of the quaternary ammonium salt by the tertiary amine and epoxy group, and the resin used in the present invention can be prepared by one step.

The amount of the quaternary ammonium salt in the vinyl chloride copolymer used in the present invention is preferably at least 0.02% by weight and not larger than 0.5% by weight as calculated as nitrogen of the quaternary ammonium salt and based on the weight of the copolymer. If the amount of the quaternary ammonium salt is smaller than 0.02% by weight, the magnetic powder-dispersing effect is poor, and if the amount of the quaternary ammonium salt is larger than 0.5% by weight, the moisture resistance of the magnetic recording medium is poor.

The vinyl chloride copolymer used as a binder in the present invention may contain, in addition to the hydroxyl group and the quaternary ammonium salt, at least one anionic hydrophilic group derived from at least one monomer which is selected from carboxylic acids, sulfur-containing acids, phosphorus-containing acids, and salts thereof.

As the monomer for introducing a carboxylic acid, a sulfur-containing acid, a phosphorus-containing acid or a salt thereof into the vinyl chloride copolymer used in the second aspect of the present invention, there can be mentioned unsaturated mono-and di-carboxylic acids such as acrylic acid, methacrylic acid, maleic acid, itaconic acid, crotonic acid and vinylacetic acid, monoalkyl esters of unsaturated dicarboxylic acids, e.g., maleic acid and itaconic acid, such as monomethyl maleate, mono-2-hydroxyethyl maleate, monobutyl itaconate and mono-2-hydroxypropyl itaconate, sulfur-containing acids such as sulfonic acids and sulfuric acids, phosphorus-containing acids such as phosphoric acid and phosphonic acid, and radical-polymerizable monomers containing alkali metal or ammonium salts of the foregoing acids, described hereinafter. Sulfonic acid and salts thereof are easily available and include various kinds. For example, there can be mentioned acids such as vinylsulfonic acid, methylvinylsulfonic acid, (meth)allylsulfonic acid, styrenesulfonic acid, ethyl (meth)acrylic-2-sulfonate, 2-acrylamido-2-methylpropane-sulfonic acid and 3-allyloxy-2-hydroxypropane-sulfonic acid, and alkali metal salts and ammonium salts of these acids. As examples of the monomer having sulfuric acid or a salt thereof, there can be mentioned acids such as ethyl (meth)acrylic -2-sulfate and 3-allyloxy-2-hydroxypropane-sulfuric acid, and alkali metal salts and ammonium salts thereof. As examples of the monomer having phosphoric acid or a salt there of, there can be mentioned propyl (meth)acrylic -3-chloro-2-phosphate, ethyl (meth)acrylic-2-phosphate and 3-allyloxy-2-hydroxypropane-phosphoric acid, and alkali metal salts and ammonium salts thereof. As examples of the monomer having phosphonic acid or a salt thereof, there can be mentioned acids such as vinylphosphonic acid, acrylamidomethane-phosphonic acid, ethyl 2-phosphonate-(meth)acrylate and 3-allyloxy -2-hydroxypropane-phosphonic acid, and alkali metal salts and ammonium salts of the foregoing acids.

In connection with the vinyl chloride copolymer containing the anionic hydrophilic group, used in the present invention, especially when an epoxy group-containing monomer is copolymerized with a hydroxyl group-containing monomer and vinyl chloride, a method can be adopted in which an alkali metal or ammonium salt of a carboxylic acid or a sulfur- or phosphorus-containing acid is added to the site of the epoxy group in the aqueous or non-aqueous system during the copolymerization reaction or before or after the copolymerization reaction. As the alkali metal or ammonium salt of the sulfur- or phosphorus-containing acid used in this method, there can be mentioned potassium phosphite, sodium thiosulfate, ammonium hydrogensulfate, disodium hydrogenphosphite, ammonium hydrogenphosphite, potassium sulfanilate, potassium persulfate and sodium perphosphate. The method of the addition of a salt of a sulfur- or phosphorus-containing acid in the copolymerization of the epoxy group-containing monomer and vinyl chloride is described in detail in Japanese Unexamined Patent Publication No. 60-238306, No. 60-23871 and No. 61-53367.

Preferably, the amount of such anionic hydrophilic groups is such that equivalent of the molecular weight of the vinyl chloride copolymer per hydrophilic group is from 4,000 to 40,000. If the equivalent is smaller than 4,000, the moisture resistance of the magnetic recording medium is reduced, and if the equivalent is larger than 40,000, the effect of improving the dispersibility by the copresence with the quaternary ammonium salt is low.

For the polymerization for obtaining the vinyl chloride copolymer used in the present invention, other copolymerizable monoethylenically unsaturated monomer can be used according to need. As examples of the copolymerizable monoethylenically unsaturated monomer, there can be mentioned vinyl esters of carboxylic acids such as vinyl acetate and vinyl propionate, vinyl ethers such as methyl vinyl ether, isobutyl vinyl ether and cetyl vinyl ether, vinylidene compounds such as vinyidene chloride and vinylidene fluoride, unsaturated carboxylic acid anhydrides such as maleic anhydride and itaconic anhydride, alkyl esters of unsaturated carboxylic acids such as diethyl maleate, dibutyl maleate, diethyl itaconate, methyl (meth)acrylate and ethyl (meth)acrylate, olefins such as ethylene and propylene, unsaturated nitriles such as (meth)acrylonitrile, aromatic vinyl compounds such as styrene, $\alpha$-methylstyrene and p-methylstyrene, and epoxy group-containing monomers such as allylglycidyl ether, glycidyl methacrylate and vinylcyclohexene monooxide.

These comonomers are used for improving the solubility of the copolymer while adjusting the compatibility of the copolymer with another resin and the softening point of the copolymer. The amount of the comonomers is 0 to 30% by weight based on the total monomers.

The polymerization degree of the copolymer is 200 to 900, preferably 250 to 500. If the polymerization degree is lower than 200, the abrasion resistance of the magnetic layer is too low, and if the polymerization degree is higher than 900, the viscosity of the paint is high and the dispersion of the magnetic powder is often poor.

The vinyl chloride copolymer for a magnetic paint, used in the present invention, can be prepared according to any known polymerization process. From the viewpoint of the solubility of the polymer, the solution polymerization or the suspension polymerization using a lower alcohol such as methanol or ethanol solely or in combination with deionized water as the polymerization medium is preferably adopted. Furthermore, the emulsion polymerization is preferably adopted when a water-soluble salt of a strong acid radical containing sulfur or phosphorus. As the polymerization initiator used for the preparation of the resin, there can be mentioned organic peroxides such as lauroyl peroxide, diisopropyl peroxydicarbonate, di-2-ethylhexyl peroxydicarbonate, t-butyl peroxypivalate and 3,5,5-trimethylhexanoyl peroxide, azo compounds such as $\alpha,\alpha'$-azobisisobutyronitrile, and ammonium persulfate and potassium persulfate. As the suspending agent, there can be mentioned synthetic polymeric substances such as polyvinyl alcohol, partially saponified polyvinyl acetate, cellulose derivatives, e.g., methylcellulose, polyvinyl pyrrolidone, a maleic anhydride/vinyl acetate copolymer and polyacrylamide, and natural polymeric substances such as starch and gelatin. As the emulsifier, there can be mentioned anionic emulsifiers such as sodium alkylbenzene-sulfonate and sodium laurylsulfate, and nonionic emulsifiers such as polyoxyethylene alkyl ether and partially esterified polyoxyethylene sorbitol fatty acid. A molecular weight modifier such as trichloroethylene or thioglycol can be used according to need. The above-mentioned polymerization initiator, vinyl chloride, other monomers, the suspending agent, the emulsifier and the molecular weight modifier can be collectively added to the polymerization system at the start of the polymerization, or they can be added dividedly during the polymerization. Usually, the polymerization is carried out at a temperature of 35 to 80° C. with stirring.

The obtained vinyl chloride copolymer, like an ordinary vinyl chloride copolymer binder for a magnetic paint, is dissolved in an optional solvent to form a solution together with a polyurethane resin, a curing agent represented by a polyisocyanate, the magnetic powder and other ingredients, and the solution is coated on a non-magnetic support such as a polyester film.

A polyurethane obtained by reaction of a polyester polyol or polyether polyol with an isocyanate can be mentioned as a typical instance of the polyurethane resin, and a polyurethane resin having hydroxyl groups left therein is preferably used. To improve the dispersibility, a polyurethane resin having an ion-dissociative hydrophilic group such as $COOM$, $SO_3M$, $SO_4M$, $PO(PM)_2$ or $N^+R_1R_2R_3X^-$ is especially preferably used. If desired, an ordinary resin binder for a magnetic paint, such as a vinyl chloride/vinyl acetate copolymer resin, a cellulose resin, a phenoxy resin, an epoxy resin, a butyral resin, an acrylic resin or an acrylonitrile/-butadiene rubber, can be used in combination with the binder of the present invention, as long as the attainment of the objects of the present invention is not hindered.

As the magnetic powder, there can be mentioned powders of iron oxides such as $\gamma-Fe_2O_3$, $Fe_3O_4$, Co-containing $\gamma-Fe_2O_3$ and Co-containing $Fe_3O_4$, and magnetic metal powders such as Fe powder and Fe-Co powder.

For the preparation of the vinyl chloride copolymer used in the present invention, the monoallyl ether of a polyhydroxyl compound is used as the hydroxyl group-containing component instead of vinyl alcohol or a hydroxyalkyl acrylate, whereby deterioration by the saponification or reduction of the thermal stability by the copolymerization with an acrylate can be controlled and the reactivity with the isocyanate can be drastically improved, with the result that the amount of the hydroxyl group required for the reaction can be drastically reduced. The reason thereof has not been sufficiently elucidated, but it is believed that the hydroxyl groups participating in the reaction are apart from the main chain of the copolymer, the freedom of motion of the hydroxyl groups is increased by ether bonds and, since the monoallyl ether of a polyhydroxyl compound, as well as vinyl chloride, is a non-conjugated type monomer, this hydroxyl group-containing monomer has a good copolymerizability with vinyl chloride, and the hydroxyl groups are uniformly distributed in the copolymer. Since the desired reactivity is attained by a much smaller amount of hydroxyl groups, it is construed that the drastic improvement of the dispersibility of the magnetic powder is due to reduction of the mutual action between the quaternary ammonium salt or anionic hydrophilic group and the hydroxyl group, and the increase of the dispersion stability of the magnetic paint is due to reduction of the mutual action between the hydroxyl group in the copolymer and a fatty acid customarily used as the lubricant.

The present invention will now be described in detail with reference to the following examples. In the examples, all of "parts" and "%" are by weight.

COPOLYMER SYNTHESIS EXAMPLE 1

An autoclave was charged with 120 parts of deionized water, 0.6 part of methylcellulose, 0.2 part of sodium laurylsulfate and 1.2 parts of lauroyl peroxide and the deaeration was carried out. Then, 100 parts of vinyl chloride, 8 parts of vinyl acetate, 5 parts of allyl 2-hydroxyethyl ether, 3 parts of diallyldimethylammonium chloride and 120 parts of methanol were added to the autoclave and the polymerization was initiated at 60° C. When the pressure in the autoclave was reduced to 3 kg/cm$^2$, the unreacted vinyl chloride was recovered and the liquid was removed to recover a copolymer. The recovered copolymer was washed with cold water and dried to obtain copolymer sample (A).

COPOLYMER SYNTHESIS EXAMPLE 2

Copolymer sample (B) was prepared in the same manner as described in Copolymer Synthesis Example 1 except that allyl 2-hydroxy-3-chloropropyl ether was used instead of allyl 2-hydroxyethyl ether.

COPOLYMER SYNTHESIS EXAMPLE 3

A deaerated autoclave was charged with 70 parts of vinyl chloride, 220 parts of methanol, 7 parts of allyl 2-hydroxypropyl ether and 1 part of α-cumylperoxyneodecanoate, and the temperature was elevated to 43° C. A mixture comprising 30 parts of vinyl chloride, 0.4 part of methacryloyloxyethyltrimethylammonium chloride and 14 parts of methanol was continuously added into the autoclave over a period of 6 hours from the point just after initiation of the polymerization at 43° C. After 10 minutes from the point of termination of the addition, the unreacted vinyl chloride was recovered and the liquid was removed from the slurry. The residue was dried to obtain copolymer sample (C).

COPOLYMER SYNTHESIS EXAMPLE 4

The emulsion polymerization of 70 parts of vinyl chloride, 2 parts of allyl glycidyl ether, 7 parts of allyl 2-hydroxyethyl ether and 3 parts of diallyldimethylammonium nitrate was initiated at 52° C. in 300 parts of an aqueous solution of an emulsifier by a cumene hydroperoxide/sodium formaldehyde-sulfoxylate initiator system. When the inner pressure of the autoclave was reduced to 6.5 kg/cm$^2$, 10 parts of vinyl chloride was added into the autoclave. This addition operation was conducted three times as a whole. When the pressure was reduced to 3.0 kg/cm$^2$, the reaction mixture was cooled and the unreacted vinyl chloride was recovered to obtain a polymerization liquid. Then, 10 parts of methyl ethyl ketone was added to 100 parts of the polymerization liquid, and the mixture was frozen and thawed. The formed copolymer was recovered, washed and dried to obtain copolymer sample (D).

COPOLYMER SYNTHESIS EXAMPLE 5

By using a Banbury mixer, 100 parts of a vinyl chloride/allyl glycidyl ether copolymer containing 10% of allyl glycidyl ether was kneaded at 100° C. for 40 minutes with 2 parts of dimethyllaurylamine, and the kneaded mixture was dissolved in 200 parts of tetrahydrofuran. Then, 3 parts of a 10% aqueous solution of hydrochloric acid was added to the solution and the liquid was mixed at 60° C. for 2 hours. Then, the mixture was incorporated in 4000 parts of methanol, and the resin was recovered, the liquid was removed and the residue was dried to obtain copolymer sample (E).

COPOLYMER SYNTHESIS EXAMPLE 6

Sample (F) was prepared in the same manner as described in Copolymer Synthesis Example 1 except that 2-hydroxyethyl acrylate was used instead of allyl -2-hydroxyethyl ether and was continuously added into the autoclave over a period of 8 hours from the point just after initiation of the polymerization at 60° C.

COPOLYMER SYNTHESIS EXAMPLE 7

Sample (G) was prepared in the same manner as described in Copolymer Synthesis Example 3 except that 2-hydroxypropyl methacrylate was used instead of allyl 2-hydroxypropyl ether and was continuously added into the autoclave over a period of 6 hours from the point just after initiation of the polymerization at 43° C.

COPOLYMER SYNTHESIS EXAMPLE 8

A copolymer was prepared in the same manner as described in Copolymer Synthesis Example 1 except that vinyl acetate was used instead of allyl 2-hydroxyethyl ether. Then, 100 parts of the obtained copolymer was hydrolyzed at 80° C. for 8 hours with 450 parts of methanol and 10 parts of 35% hydrochloric acid. The liquid was removed to recover a copolymer. The copolymer was treated at 50° C. in an autoclave together with 10 parts of ethylene oxide and 300 parts of water and was then washed, dehydrated and dried to obtain copolymer sample (H).

The compositions of these copolymers and the compositions of commercially available vinyl chloride/vinyl acetate/maleic acid terpolymer (I) and vinyl chloride/vinyl acetate/vinyl alcohol terpolymer (J) are shown in Table 1.

EVALUATION (1) OF COPOLYMER CHARACTERISTICS

Magnetic paints and magnetic recording media of the samples obtained in Copolymer Synthesis Examples 1 through 8 and commercially available products (I) and (J) were evaluated according to the following methods. The results are shown in Table 1.

1) Pot Life

In a mixed solvent comprising 200 parts of methyl ethyl ketone, 100 parts of methyl isobutyl ketone and 100 parts of toluene was dissolved 100 parts of the vinyl chloride copolymer at 65° C. with stirring for 1 hour, and a polyisocyanate (Coronate-L supplied by Nippon Polyurethane Kogyo) was added in an amount of 20 parts per 100 parts of the vinyl chloride copolymer to the above solution. The mixture was stored at 23° C. and the time (days) required for attaining the state where the solution did not flow even by turning the container upside down was measured as the pot life.

2) Reactivity

The solution used at the pot life test was cast on a glass plate, and the obtained sheet was treated at 60° C. for 24 hours. Then, 0.5 g, precisely measured, of the sheet was mixed with 50 g of tetrahydrofuran for 24 hours, and the insoluble substance was recovered by filtration, washed and dried and the weight was precisely measured. The reactivity was expressed in terms of the gel proportion defined by the following formula.

Gel proportion (%) = (weight of insoluble substance/(weight of sample)

3) Heat Stability

The solution used at the solubility test was cast on a glass plate kept horizontal by a level to form a sheet having a thickness of 0.05 mm, and according to the method of JIS-K-6723, the sheet was heated in an oil bath at 80° C. The time required for discoloration of Congo Red paper was measured.

4) Gloss

A mixture comprising 400 parts of cobalt-covered iron oxide powder having a specific surface area of 30 $m^2/g$, 50 parts of the vinyl chloride copolymer, 40 parts of a polyurethane resin (1,4-butanediol adipate/MDI type) having a hydroxyl group content of 0.3% and a molecular weight of 70,000, 500 parts of methyl ethyl ketone, 300 parts of methyl isobutyl ketone, 300 parts of toluene, 2 parts of carbon black, 4 parts of alumina, 2 parts of myristic acid and 1 part of butyl stearate was dispersed under high-speed shearing for 90 minutes. Then, 15 parts of a polyisocyanate (Coronate-L supplied by Nippon Polyurethane Kogyo) was added to the composition, and the composition was further stirred for 15 minutes to obtain a magnetic paint. The obtained magnetic paint was coated in a thickness of 5 μm on a polyester film, and the coating was subjected to the magnetic field orientation treatment and then dried. The reflectance of the obtained magnetic coating was measured at a reflection angle of 60° by a gloss meter. The gloss was expressed in terms of the reflectance.

5) Dispersion Stability

The solution used at the gloss test was allowed to stand for one hour and then coated in a thickness of 5 μm on a polyester film, and the coating was subjected to the magnetic field orientation treatment and then dried. The reflectance of the obtained magnetic coating was measured at a reflection angle of 60° by a gloss meter. The dispersion stability was expressed in terms of the reflectance.

6) Squareness (Br/Bm)

The magnetic coating used for the evaluation of the gloss was cut into a test piece having a size of 12.5 mm × 50 mm, and the squareness was measured by using a magnetic characteristic-measuring device.

7) Durability

The magnetic coating used for the evaluation of the gloss was smoothed by a calender roll, heat-treated at 65° C. for 65 hours and brought into contact with an abrasive paper-attached rotary drum under a load of 100 g. The rotary drum was rotated at 150 rpm, and the degree of sticking of the magnetic paint to the abrasive paper was observed with the naked eye and the durability was evaluated by three grades of A (good), B (fair) and C (poor).

TABLE 1

| Copolymer Synthesis Example No. | Examples | | | | | Comparative Examples | | | | |
|---|---|---|---|---|---|---|---|---|---|---|
| | 1 | 2 | 3 | 4 | 5 | 6 | 7 | 8 | — | — |
| Composition of copolymer | | | | | | | | | | |
| Copolymer sample | A | B | C | D | E | F | G | H | I | J |
| Content of nitrogen of quaternary ammonium salt in copolymer (%) | 0.08 | 0.07 | 0.04 | 0.05 | 0.08 | 0.08 | 0.04 | 0.04 | — | — |
| Hydroxyl group content in copolymer (%) | 0.3 | 0.4 | 0.5 | 0.4 | 0.6 | 0.7 | 1.5 | 0.8 | — | 2.3 |
| OH-group-containing monomer *1 | (a) | (b) | (c) | (a) | (b), (d) | (a)' | (b)' | (e) | — | (e) |
| Degree of polymerization | 370 | 360 | 300 | 430 | 390 | 390 | 300 | 430 | 400 | 430 |
| Characteristics of paint | | | | | | | | | | |

TABLE 1-continued

| Copolymer Synthesis | Examples | | | | | Comparative Examples | | | | |
|---|---|---|---|---|---|---|---|---|---|---|
| Example No. | 1 | 2 | 3 | 4 | 5 | 6 | 7 | 8 | — | — |
| and magnetic sheet | | | | | | | | | | |
| Pot life (days) | 7 | 9 | 10 | 9 | 6 | 3 | 1 | 2 | >30 | 20 |
| Reactivity (%) | 85 | 82 | 91 | 89 | 93 | 59 | 82 | 67 | 17 | 80 |
| Heat stability (hrs) | 52 | 58 | 36 | 72 | 120 | 1.5 | 0.5 | 1 | 0.5 | 6 |
| Gloss (%) | 97 | 96 | 98 | 93 | 97 | 89 | 90 | 72 | 52 | 32 |
| Dispersion stability (%) | 95 | 92 | 92 | 92 | 94 | 48 | 39 | 19 | 43 | 17 |
| Squareness (—) | 0.86 | 0.86 | 0.86 | 0.85 | 0.86 | 0.84 | 0.84 | 0.76 | 0.76 | 0.75 |
| Durability | A | A | A | A | A | B | A | B | B | C |

*(a) Allyl 2-hydroxyethyl ether
(b) Allyl 2-hydroxy-3-chloropropyl ether
(c) Allyl 2-hydroxypropyl ether
(d) Glycerol monoallyl ether
(a)' 2-Hydroxyethyl acrylate
(b)' 2-Hydroxypropyl methacrylate
(e) Vinyl alcohol

COPOLYMER SYNTHESIS EXAMPLE 9

An autoclave charged with 2 parts of benzoyl peroxide was deaerated, and 100 parts of vinyl chloride, 5 parts of allyl 2-hydroxyethyl ether, 2 parts of diallyldimethylammonium chloride, 10 parts of vinyl acetate and 180 parts of acetone were charged into the autoclave. Polymerization was initiated at 50° C., and immediately thereafter, 3 parts of maleic anhydride and 40 parts of methanol, which had been thoroughly premixed, were continuously added into the autoclave. When the reaction pressure was reduced to 1 kg/cm$^2$, the unreacted vinyl chloride was recovered, 250 parts of water was added to the residue, and the temperature was elevated to 70° C. to separate the copolymer from the solvent. The separated copolymer was dried to obtain copolymer sample (K).

COPOLYMER SYNTHESIS EXAMPLE 10

A polymerization vessel was charged with 117 parts of methanol, 0.6 part of methylcellulose and 0.2 part of a partial ester of polyoxyethylene sorbitol-fatty acid and the polymerization vessel was sealed. After deaeration under reduced pressure, 100 parts of vinyl chloride, 10 parts of vinyl acetate and 6 parts of allyl 2-hydroxypropyl ether were charged in the polymerization vessel, and the mixture was stirred at 50° C. Then, 1.0 part of 3,5,5-trimethylhexanoyl peroxide was added to the mixture to initiate the polymerization, and simultaneously, a solution of 1 part of methacryloyloxyethyltrimethylammonium chloride and 3 parts of 2-acrylamido-2-methylpropanesulfonic acid in 80 parts of methanol was continuously charged at a constant rate so that all of the solution was consumed in 8 hours. When 10 hours passed from the start of the polymerization and the pressure in the polymerization vessel was reduced to 2 kg/cm$^2$, the reaction mixture was cooled, and the unreacted vinyl chloride was recovered. The liquid was removed, and the residue was washed and dried to obtain copolymer sample (L).

COPOLYMER SYNTHESIS EXAMPLE 11

Copolymer sample (M) was prepared in the same manner as described in Copolymer Synthesis Example 10 except that ethyl methacrylic-2-phosphate was used instead of 2-acrylamido-2-methyl-propanesulfonic acid.

COPOLYMER SYNTHESIS EXAMPLE 12

Copolymer sample (N) was prepared in the same manner as described in Copolymer Synthesis Example 10 except that sodium styrenesulfonate was used instead of 2-acrylamido-2-methylpropanesulfonic acid.

COPOLYMER SYNTHESIS EXAMPLE 13

A polymerization vessel was charged with 150 parts of deionized water, 1 part of sodium laurylsulfate and 3 parts of potassium persulfate, and after deaeration, 60 parts of vinyl chloride, 3 parts of allyl glycidyl ether, 3 parts of diallyldimethylammonium chloride and 6 parts of allyl 2-hydroxyethyl ether were further charged and the temperature was elevated to 60° C. to initiate the polymerization. After initiation of the polymerization, a liquid mixture comprising 2 parts of sodium styrenesulfonate and 50 parts of water was continuously added over a period of 10 hours, and 40 parts of vinyl chloride was added in four parts dividedly, and the polymerization was continued for 10 hours. Then, the unreacted vinyl chloride was recovered to obtain the polymerization liquid. Then, 100 parts of the polymerization liquid was mixed with 5 parts of methyl ethyl ketone, and the mixture was frozen and thawed. The copolymer was recovered, washed and dried to obtain copolymer sample (O).

COPOLYMER SYNTHESIS EXAMPLE 14

A copolymer was prepared in the same manner as described in Copolymer Synthesis Example 13 except that allyl glycidyl ether was used instead of diallyldimethylammonium chloride and sodium styrenesulfonate was not used. Then, 100 parts of the obtained copolymer resin, 1 part of pyridine and 1 part of acetic acid were dissolved in 250 parts of methyl ethyl ketone, and reaction was carried out at 60° C. for 24 hours. The reaction mixture was incorporated into 1,000 parts of methanol, and the thus-precipitated reaction product was recovered. Then, the reaction product was dissolved in 300 parts of tetrahydrofuran, the solution was incorporated into 1,000 parts of water, and the thus-precipitated resin was washed with water and dried to obtain copolymer sample (P).

COPOLYMER SYNTHESIS EXAMPLE 15

Copolymer sample (Q) was prepared in the same manner as described in Resin Synthesis Example 11 except that 2-hydroxypropyl methacrylate was charged together with ethyl methacrylic-2-phosphate instead of allyl-2-hydroxypropyl ether.

COPOLYMER SYNTHESIS EXAMPLE 16

Copolymer sample (R) was prepared in the same manner as described in Copolymer Synthesis Example 10 except that methacroyloxyethyltrimethylammonium chloride was not used.

COPOLYMER SYNTHESIS EXAMPLE 17

Copolymer sample (S) was prepared in the same manner as described in Copolymer Synthesis Example 10 except that 2-acrylamido-2-methylpropanesulfonic acid was not used.

COPOLYMER SYNTHESIS EXAMPLE 18

A vinyl chloride/vinyl acetate copolymer containing maleic acid and a quaternary ammonium salt was prepared in the same manner as described in Copolymer Synthesis Example 9 except that vinyl acetate was used instead of allyl 2-hydroxyethyl ether. Then, 100 parts of the copolymer was hydrolyzed at 80° C. for 8 hours with 450 parts of water and 10 parts of 35% hydrochloric acid. The liquid was removed and the polymer was recovered. The polymer was stirred at 50° C. for 3 hours together with 10 parts of ethylene oxide and 300 parts of water, and washing, dehydration and drying were carried out to obtain copolymer sample (T).

COPOLYMER SYNTHESIS EXAMPLE 19

Copolymer sample (U) was prepared in the same manner as described in Copolymer Synthesis Example 13 except that glycidyl methacrylate was used instead of allyl glycidyl ether, 2-hydroxyethyl methacrylate was used instead of allyl 2-hydroxyethyl ether, they were continuously added together with sodium styrenesulfonate after the initiation of the polymerization and the amount of potassium persulfate was reduced to 1 part.

The results of the analysis of these resins and the results of the evaluation of magnetic paints and magnetic recording media of these resins and commercially available products (I) and (J) are shown in Table 2. The evaluation was carried out according to the following methods.

1) Reactivity and 2) Heat Stability

These properties were determined according to the same methods as described above with reference to the data shown in Table 1.

3) Gloss

A mixture comprising 400 parts of a metallic iron magnetic powder, 70 parts of the vinyl chloride copolymer, 30 parts of a polyurethane resin (Nippollan 2304 supplied by Nippon Polyurethane Kogyo), 300 parts of methyl ethyl ketone, 300 parts of toluene, 4 parts of a higher fatty acid and 2 parts of a silicone oil was dispersed under high-speed shearing for 90 minutes. Then, 15 parts of a polyisocyanate (Coronate-L supplied by Nippon Polyurethane Kogyo) and 100 parts of cyclohexanone were further added, and the mixture was further dispersed for 90 minutes to obtain a magnetic paint. The obtained magnetic paint was coated in a thickness of 5 $\mu$m on a polyester film. The coating was subjected to a magnetic field orientation treatment and dried. The reflectance of the obtained magnetic coating at a reflection angle of 60° was measured by a gloss meter.

4) Dispersion Stability

The paint used for the evaluation of the gloss was allowed to stand for 1 hour, and the paint was coated in a thickness of 5 $\mu$m on a polyester film. The coating was subjected to a magnetic field orientation treatment and was then dried. The reflectance of the obtained magnetic coating at a reflection angle of 60° was measured by a gloss meter.

5) Squareness (Br/Bm)

The magnetic coating used for the evaluation of the gloss was cut into a test piece having a size of 1.25 mm × 50 mm, and the squareness was measured by a magnetic characteristic measuring device.

6) Storage Stability (Bm'/Bm)

The test piece used for the evaluation of the squareness was placed in an atmosphere maintained at a temperature of 60° C. and a relative humidity of 90% for 1 week, and the saturation induction (Bm') was measured by a magnetic characteristic measuring device. The ratio of this saturation induction (Bm') to the saturation induction (Bm) before the exposure to the abovementioned environment was calculated.

7) Durability

The magnetic coating used for the evaluation of the gloss was smoothed by a calender roll and heat-treated at 65° C. for 65 hours. Then, the coating was brought into contact with an abrasive paper-attached rotary drum under a load of 100 g and the drum was rotated at 150 rpm. The degree of sticking of the magnetic paint to the abrasive paper was observed with the naked eye and the durability was evaluated by four grades of A (good), B (fair) and C (poor).

TABLE 2

| Copolymer Synthesis Example No. | Examples | | | | | | | Comparative Examples | | | | | |
|---|---|---|---|---|---|---|---|---|---|---|---|---|---|
| | 9 | 10*2 | 11 | 12 | 14 | 14 | 17*2 | 15 | 16 | 18 | 19 | — | — |
| Composition of copolymer | | | | | | | | | | | | | |
| Copolymer sample | K | L | M | N | O | P | S | Q | R | T | U | I | J |
| Content of N of quaternary ammonium salt in copolymer | 0.05 | 0.07 | 0.07 | 0.07 | 0.04 | 0.05 | 0.07 | 0.07 | — | 0.05 | 0.04 | — | — |
| Anionic hydrophilic group and equivalent thereof | COOH | SO$_3$H | PO(OH)$_2$ | SO$_3$Na | SO$_4$K SO$_3$Na | SO$_4$K | — | PO(OH)$_2$ | SO$_3$H | COOH | SO$_3$K SO$_3$Na | COOH | — |
| | 4,600 | 10,000 | 11,000 | 18,000 | 14,000 | 18,000 | | 9,800 | 10,000 | 4,300 | 13,000 | 5,600 | |
| OH-group-containing monomer*1 | (a) | (c) | (c) | (c) | (a) | (a) | (c) | (b)' | (c) | (e) | (a)' | — | (e) |
| Content of —OH in copolymer | 0.3 | 0.5 | 0.5 | 0.5 | 0.3 | 0.3 | 0.5 | 0.7 | 0.5 | 1.8 | 0.7 | | 2.3 |
| Degree of polymerization | 400 | 320 | 320 | 320 | 380 | 360 | 320 | 320 | 320 | 400 | 400 | 400 | 430 |
| Characteristics of paint and magnetic sheet | | | | | | | | | | | | | |

TABLE 2-continued

| Copolymer Synthesis Example No. | Examples | | | | | | | Comparative Examples | | | | | |
|---|---|---|---|---|---|---|---|---|---|---|---|---|---|
| | 9 | 10*2 | 11 | 12 | 14 | 14 | 17*2 | 15 | 16 | 18 | 19 | — | — |
| Reactivity (%) | 83 | 86 | 86 | 86 | 83 | 83 | 86 | 52 | 86 | 67 | 50 | 17 | 80 |
| Heat stability (hrs) | 36 | 35 | 36 | 37 | 72 | 72 | 52 | 2 | 32 | 0.1 | 0.5 | 0.5 | 6 |
| Gloss (%) | 95 | 107 | 101 | 105 | 107 | 107 | 72 | 101 | 96 | 70 | 52 | 17 | 10 |
| Dispersion stability (%) | 95 | 105 | 100 | 103 | 107 | 107 | 60 | 96 | 48 | 2 | 1 | 1 | 1 |
| Squareness (—) | 0.83 | 0.84 | 0.83 | 0.84 | 0.84 | 0.84 | 0.82 | 0.83 | 0.82 | 0.79 | 0.77 | 0.72 | 0.72 |
| Storage stability (%) | 85 | 85 | 86 | 84 | 90 | 90 | 85 | 72 | 85 | 70 | 70 | 65 | 70 |
| Durability | A | A | A | A | A | A | A | B | A | B | C | C | C |

*1(a), (b), (a)', (b)' and (e) are the same as those in Table 1.
*2Examples 10 and 17 are given to compare the first and second aspects of the present invention.

We claim:

1. An improvement in a magnetic recording medium having a magnetic layer comprising a vinyl chloride copolymer as a binder and a magnetic powder and formed on a nonmagnetic support, said improvement residing in the vinyl chloride copolymer which has a degree of polymerization of from 200 to 900 and which contains hydroxyl groups and quaternary ammonium salt groups, wherein said hydroxyl groups are derived from at least one monomer selected from the group consisting of a monoallyl or monomethallyl ether of polyhydroxyl compounds, and a monoallyl or monomethally thioether of polyhydroxyl compounds; the content of the hydroxyl groups in the vinyl chloride copolymer being 0.05 to 3.0% by weight based on the weight of the copolymer and the amount of the quaternary ammonium salt groups in the vinyl chloride copolymer being 0.02 to 0.5% by weight calculated as nitrogen of the quaternary ammonium salt groups and based on the weight of the copolymer.

2. The magnetic recording medium according to claim 1 wherein the monoallyl or monomethallyl ether of polyhydroxyl compound is selected from the group consisting of monoallyl or monomethallyl ethers of alkylene glycols, monoallyl or monomethallyl ethers of polyoxyalkylene glycols, monoallyl or monomethallyl ethers of halogen-substituted and hydroxyl-substituted alkylene or polyalkylene glycols, and monoallyl or monomethallyl ethers of polyhydric phenols and halogen substituted products thereof.

3. The magnetic recording medium according to claim 1, wherein the quaternary ammonium salt is derived from a quaternary ammonium salt-containing monomer.

4. The magnetic recording medium according to claim 1, wherein the vinyl chloride copolymer having the quaternary ammonium salt is formed by treating a vinyl chloride copolymer having an epoxy group, with a tertiary amine, said vinyl chloride copolymer having an epoxy group being prepared by copolymerizing vinyl chloride with an epoxy group-containing monomer or by epoxidization of double bonds formed by dehydrochlorination of a vinyl chloride copolymer.

5. The magnetic recording medium according to claim 1, wherein said vinyl chloride copolymer further contains at least one anionic hydrophilic group derived from at least one monomer selected from the group consisting of carboxylic acids, sulfur-containing acids, phosphorus-containing acids and salts thereof.

6. The magnetic recording medium according to claim 5, wherein the monoallyl or monomethallyl ether of polyhydroxyl compound is selected from monoallyl or monomethallyl ethers of alkylene glycols, monoallyl or monomethallyl ethers of polyoxyalkylene glycols, monoallyl or monomethallyl ethers of halogen-substituted and hydroxyl-substituted alkylene or polyalkylene glycols, and monoallyl or monomethallyl ethers of polyhydric phenols and halogen substituted products thereof.

7. The magnetic recording medium according to claim 5, wherein the quaternary ammonium salt is derived from a quaternary ammonium salt-containing monomer.

8. The magnetic recording medium according to claim 5, wherein the vinyl chloride copolymer having the quaternary ammonium salt is formed by treating a vinyl chloride copolymer having an epoxy group, with a tertiary amine, said vinyl chloride copolymer having an epoxy group being prepared by copolymerizing vinyl chloride with an epoxy group-containing monomer or by epoxidization of double bonds formed by dehydrochlorination of a vinyl chloride copolymer.

9. The magnetic recording medium according to claim 5, wherein said monomer is selected from the group consisting of unsaturated mono- or dicarboxylic acids, monoalkyl esters of unsaturated dicarboxylic acids, sulfonic acids, sulfuric acids, phosphoric acids, phosphonic acids, and alkali or ammonium salts thereof.

10. The magnetic recording medium according to claim 8, wherein the amount of the anionic hydrophilic group is such that the molecular weight of the vinyl chloride copolymer per hydrophilic group is from 4,000 to 40,000.

11. The magnetic recording medium according to claim 1, wherein the magnetic layer further comprises a polyisocyanate as a curing agent.

* * * * *